Dec. 6, 1960    R. F. ZANG    2,963,080
SAFETY BELT ASSEMBLIES
Filed Nov. 26, 1956    3 Sheets-Sheet 1

INVENTOR
ROBERT F. ZANG

BY Strauch, Nolan & Neale
ATTORNEYS

Dec. 6, 1960 R. F. ZANG 2,963,080
SAFETY BELT ASSEMBLIES
Filed Nov. 26, 1956 3 Sheets-Sheet 2
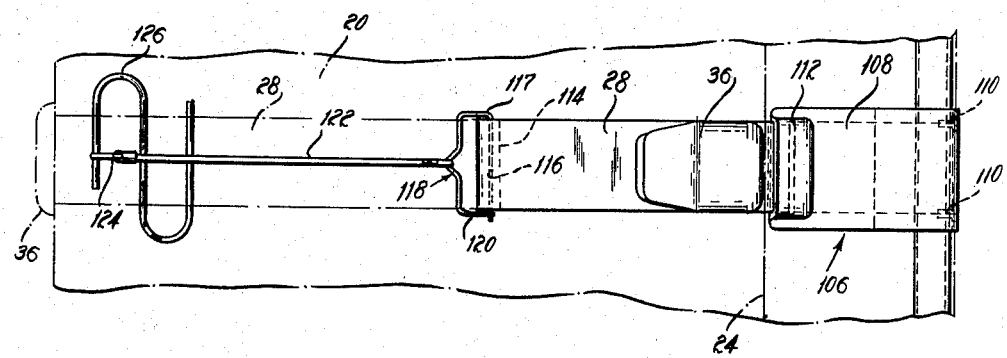
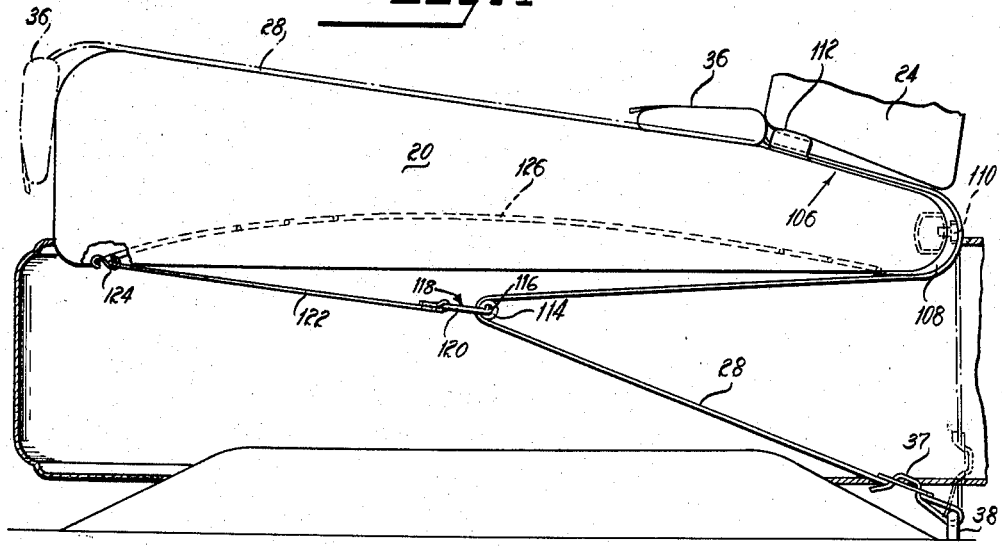
INVENTOR
ROBERT F. ZANG
BY
ATTORNEYS Dec. 6, 1960 R. F. ZANG 2,963,080
SAFETY BELT ASSEMBLIES
Filed Nov. 26, 1956 3 Sheets-Sheet 3
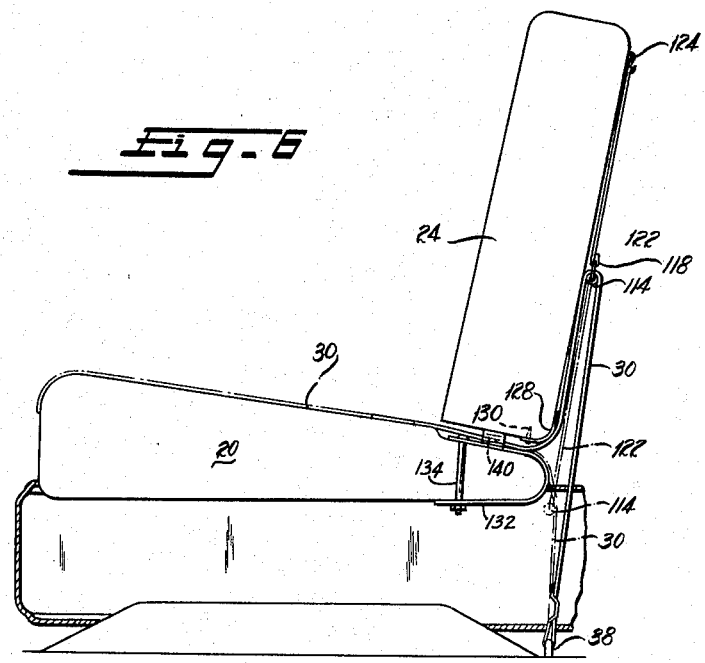
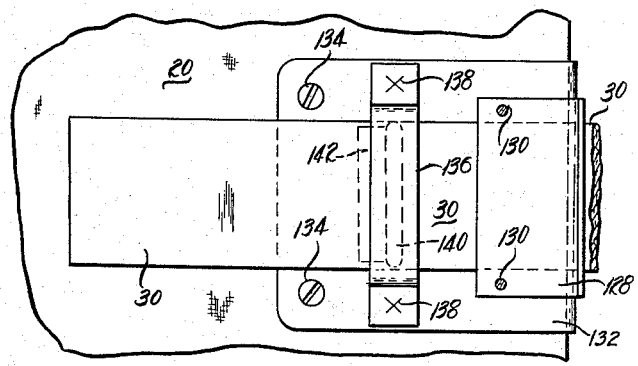
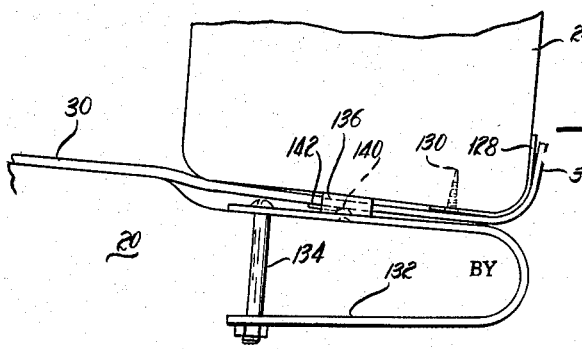
INVENTOR
ROBERT F. ZANG
BY Strauch, Nolan & Neale
ATTORNEYS

United States Patent Office 2,963,080
Patented Dec. 6, 1960

2,963,080

SAFETY BELT ASSEMBLIES

Robert F. Zang, Detroit, Mich., assignor to Hupp Corporation, Detroit, Mich., a corporation of Virginia Filed Nov. 26, 1956, Ser. No. 627,089

1 Claim. (Cl. 155—189)

This invention relates to safety belt assemblies for vehicles and more particularly to such assemblies which provide for retraction of the safety belts when they are not in use.

Safety belts have been used for a number of years to protect the operators and passengers of aircraft and racing vehicles. Recently such belt assemblies have come into widespread use in standard passenger vehicles. In passenger cars the safety belts are usually installed in the front seat and a complete installation to protect the driver and a passenger includes four belt sections each attached at one end to the vehicle frame adjacent the rear edge of the front seat. The belts extend upwardly between the seat cushion and the seat back and when not in use rest loosely on the seat cushion.

Since the free ends of the belts are provided with relatively heavy attaching buckles they are unsightly and their presence on the seat cushion may cause considerable inconvenience and annoyance.

In recognition of these factors many proposals have been made for retracting the seat belts when they are not in use. However all of the known prior constructions incorporate a spring or other resilient device such as a take-up reel between the portion of the seat belt which holds the passengers and the point at which the belt is attached to the vehicle frame. Any such system, which, in effect, makes the spring a part of the seat belt, reduces the impact resistance of the belt to a degree which renders it incapable of providing the desired protection.

With the foregoing considerations in mind it is the principal purpose and object of the present invention to provide improved retractable seat belt assemblies, which, when extended for use have the same effectiveness, impact resistance and rigidity as the fixed or non-retractable belts now in use.

In accomplishing this primary objective the present invention provides seat belts which are attached to a suitable anchor point in the vehicle and a retractor which engages the span of the belt between its point of attachment and the rear edge of the seat. The retractor is preferably mounted on the underside of the seat cushion and is spring biased in a direction to form a loop in the belt to thereby pull the free end of the belt to a retracted position.

It is a further object of the present invention to provide improved retractable safety belt assemblies which may be installed easily in standard vehicles without modification and which utilize otherwise unoccupied space within the vehicle.

It is a further object to provide improved retractable seat belt assemblies which are of rugged, simple and inexpensive construction.

It is an additional object of the present invention to provide improved retractable seat belt assemblies which include a control readily accessible to the operator for retracting the seat belts or holding the seat belts in fully extended position.

Additional objects and advantages will become apparent as the description proceeds in connection with the accompanying drawings in which:

Figure 4 is a transverse section similar to Figure 2, showing details of construction of one of the four identical retractor assemblies of a modified form of the invention;

Figure 5 is a fragmentary top plan view of the assembly of Figure 4;

Figure 6 is a side view of another form of the invention;

Figure 7 is a fragmentary top plan view of the apparatus of Figure 6; and

Figure 8 is an enlarged fragmentary side view of the apparatus of Figure 7.

While for present purposes the invention will be disclosed as applied to an automobile it is to be understood that the invention may be used whenever seat belts are used. The term "vehicle" as used herein is intended to apply to all types of conveyances such as boats, trains, and aircraft where seat belts are used.

Figure 1:
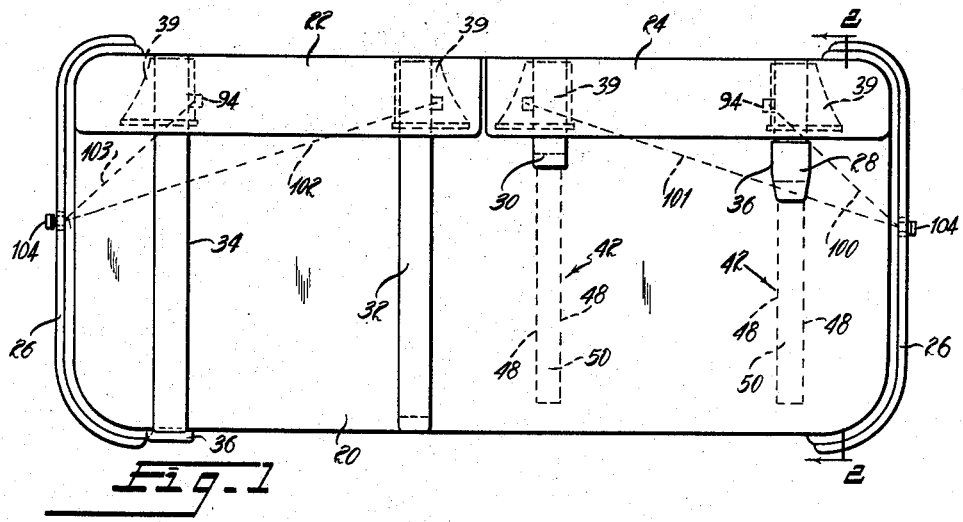
Figure 1 is a top plan view of the seat belt assembly of the present invention installed in the front seat of a standard passenger vehicle, the two belt sections at the left of the figure being shown in fully extended position and the two belts at the right of the figure being shown in retracted position.
Figure 2:
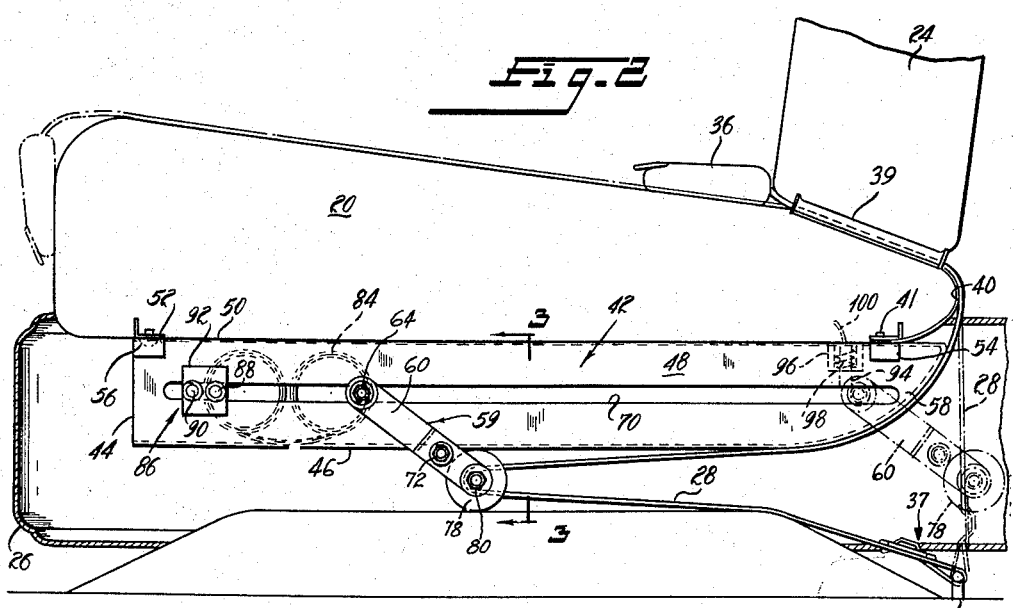
Figure 2 is a transverse section taken along line 2—2 of Figure 1 showing details of construction of one of the four identical retractor assemblies.
Figure 3:
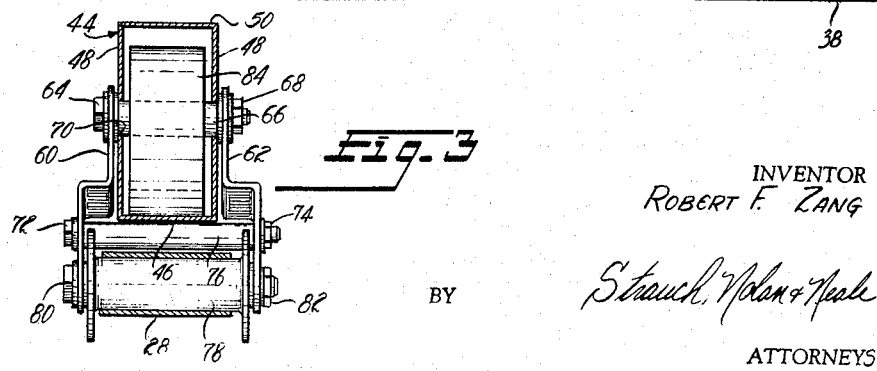
Figure 3 is a section taken along line 3—3 of Figure 2 showing additional details of construction.

Referring now more particularly to Figures 1–3 of the drawings Figure 1 illustrates a standard passenger car front seat having a seat cushion 20 and a divided seat back comprising back cushions 22 and 24 mounted on the seat frame 26 for tilting movement in the usual manner. While a divided seat back has been shown it will be understood that the invention may be utilized successfully in a seat having a one-piece back.

The seat belt assembly for the driver includes the belts 28 and 30 and the assembly for the passenger includes the belts 32 and 34. In accordance with conventional practice each of the belts comprises a flexible length of webbing. The free ends of the belts 28 and 34 are provided with the usual releasable clamps 36.

The opposite ends of the belts are attached by conventional clamp assembly indicated generally at 37 to fittings 38 which extend through the floor of the vehicle adjacent the rear edge of the seat cushion 20 and are rigidly secured by means not shown to the vehicle frame, cross members, floor or plates.

As best shown in Figure 2 the belts extend upwardly from the fittings 38 over the rear edge of the seat cushion 20 and between the cushion 20 and the adjacent seat back 22 or 24. When the belts are fully extended for use the span of the belt between the fitting 38 and the rear edge of the seat is substantially straight as shown in dotted lines in Figure 2 regardless of the position of the seat.

To facilitate retraction and extension of the belts the present invention provides a sleeve guide assembly 39 for each of the belts in the form of a sleeve encircling the belt between the seat cushion 20 and the seat back section 22 or 24. The sleeve guide assemblies 39 each include an attaching strip 40 which extends around the rear edge of the seat cushion 20 and is attached to the underside of the cushion frame by one or more bolts 41.

Four identical retractor assemblies 42 are provided, one for each of the belt sections 28, 30, 32 and 34. The retractor assembly 42 for the belt section 28 is shown in Figures 2 and 3 to which detailed reference will now be made.

The retractor assembly 42 includes a guide assembly comprising a hollow channel assembly 44 formed of sheet metal. The channel is of generally rectangular shape and includes a flat bottom wall 46, flat side walls 48 and a top wall 50. The channel assembly 44 is rigidly secured to the frame of the cushion 20 by clips 52 and 54 the former being secured to the cushion frame by a bolt 56 and the latter being secured to the cushion frame by the bolt 41. Each of the channels is disposed generally in alignment with the adjacent one of the belts and extends along the underside of the seat cushion 20 substantially from the back to the front thereof. The rearward end of the bottom wall 46 is smoothly curved as at 58 to form a substantial continuation of the curving surface at the rear edge of the seat cushion 20.

The retractors per se, indicated generally at 59 comprise a pair of brackets 60 and 62, the upper ends of which are secured together by a bolt 64 carrying a cylindrical spacer 66 and a nut 68. The spacer 66 which is of slightly greater length than the width of channel 44 extends through slots 70 cut in the side walls 48 of the channel. Intermediate their ends the brackets 60 and 62 are secured together by a similar construction including a bolt 72, nut 74 and a cylindrical spacer 76 which is adapted to ride along the lower surface of the bottom wall 46 of the channel assembly 44. At the lower ends the brackets 60 and 62 carry a flanged belt-engaging roller 78 mounted on a bolt 80 held in place by a nut 82.

The retractors are urged along the slots 70 toward the front of the seat custion 20 by a spring 84 which is in the form of a metal strap, one end of which is coiled about the spacer 66. Retainer assembly 86 comprises spaced cylinders 88 and 90 mounted on plates 92 (one shown) frictionally engaging the outer surface of the channel side walls. The coil at the opposite end of the spring strap extends between the cylinders 88 and 90. The retainer assembly 86 is adjustable along the slots 70 to accommodate various belt lengths. The construction of the spring 84 is such that its tension remains substantially constant throughout the travel of the retractor assemblies.

When the seat belts are fully extended for use the retractors occupy the dotted line position shown in Figure 2. In this position of the retractors the belt extends directly from the fitting 38 to the seat cushion 20 so that the retractor and associated spring system has no effect on the seat belt. Accordingly the seat belt has the same rigidity and impact resistance as the usual fixed installation. The retractor assemblies are held in this position by a latch member 94 suitably mounted in a clip 96 secured to the side wall of the channel 44 and biased by a spring 98 into latching position as shown in Figure 2. The bottom end of the latch member 94 is angled so as to permit the free passage of retractor assemblies to the right and to prevent passage of the retractor assemblies to the left as viewed in Figure 2.

To facilitate release of the retractors and retraction of the seat belts, cables 100—103 lead from the latch members 94 associated with each of the four retractors to control knobs 104 suitably mounted on the side of the seat frame 26 in a position to be readily accessible to the occupant of the seat. Accordingly, the seat belts may be retracted merely by momentarily pulling out the proper control knob 104 to release the latch members associated with both retractors for the belts 28 and 30 or 32 and 34. The spring 84 then pulls the retractor assemblies toward the front of the channels 44 forming a loop in the belts and drawing them through the associated guide assemblies 39 until the clamp members 36 come to rest against the seat back. When it is desired to use the belts the ends of the belts are merely pulled out until the latch members 94 engage the associated retractors.

It is a feature of the retractors of the present invention that their performance is unaffected by the lateral or vertical adjusted position of the vehicle seat. In Figure 2 the seat is shown as fully rearward position. If the seat is moved to the front with the belts extended, the retractors 59 will simply pivot in a counterclockwise direction about the axis of the spacers 66 in slots 70. The seat may be raised or lowered from the position shown without affecting the position of the retractors. Any shifting movement of the seat when the belts are retracted will merely cause the retractors 59 to move along slots 70 as required.

Figures 4 and 5 to which reference will now be made illustrate a modified form of the invention which has many of the advantages of the units described above but which is considerably simpler and less expensive to manufacture and is thus preferred for installations where cost is of primary importance.

The passenger car seat, the arrangement of the seat belts and their attachment to the vehicle are the same as in Figures 1 and 2.

The retractor assemblies and associated mechanism of each of the four belts are identical and accordingly only the one serving the belt section 28 will be described in detail.

The belt section 28 passes from the floor fitting 38 upwardly around the rear edge of the seat cushion 20 and over a guide bracket 106 between the seat cushion and the seat back 24. The bracket assembly 106 comprises a body member 108 formed of sheet metal, plastic or other suitable material extending rearwardly from a point adjacent the forward edge of the seat back curving smoothly around the rear edge of the seat cushion and terminating at a point closely adjacent the lower surface of the cushion. The guide bracket may conveniently be secured to the rear edge of the seat cushion by a pair of screws 110, the heads of which may be positioned in suitable recesses formed in the body member 108 to permit the passage of the belt smoothly over them.

A U-shaped bracket 112 of sheet metal, plastic or the like is secured to the upper surface of the member 108 adjacent the forward end of the seat back 24 preferably by suitable spot welds. The U-shaped member 112 and the forward end of the body member 108 form a channel which guides the belt 28 and permits it to pass freely between the seat cushion and the seat back 24. If desired the guide bracket may be of integral one-piece construction.

It is a feature of this form of the invention that the retractor assembly proper is of simplified low cost construction. The retractor assembly includes a cylindrical roller 114 which may be made of any suitable material including wood, plastic, or fibre which engages the belt section 28 between the fitting 38 and the lower surface of the seat cushion 20. The roller 114, the length of which is preferably substantially the same as the width of the belt section 28, is provided with a central through bore 116 through which one arm 117 of a fastener 118 extends. The fastener 118 is preferably formed from a single length of metal wire and includes a second arm 120 the free end of which is bent to form a receiving portion for the free end of the arm 117 on which the roller 114 is journalled.

The fastener 118 is connected to one end of a flexible retracting cord 122 the opposite end of which is secured by an S-hook 124 or other suitable fastening device to one of the seat springs 126 adjacent the forward edge of the seat cushion. The cord 122 may comprise rubber bands, rubber cord or other flexible, highly elastic material having sufficient stretch. The length and elasticity of the cord 122 depends on the desired speed of retraction and the resistance to extension of the belt. The normal unstressed length of the cord is such that when the seat belt is released and not in use the cord will pull the roller 114 to the position shown in full lines in Figure 4 so that the buckle 36 at the end of the seat belt will be pulled firmly against the front surface of the seat back 24. When it is desired to use the seat belts the adjacent sections, for example 28 and 30, are pulled out to full length against the light resistance of the cords 122 until there is no slack in the seat belts between the rear surface of the seat cushion 20 and the fittings 38. The belts are then fastened around the user in the usual manner. The seat belts will be automatically retracted fully when the buckle is unfastened.

While the retractor cords 122 exert a constant retracting force on the belts when they are in use nevertheless actual tests show that this pressure is not noticeable to the user and does not exceed the normal belt tension necessary to hold the passenger firmly in position.

While the forward end of the retractor cord has been illustrated as attached to the seat frame, it may, if desired, be attached to the vehicle floor or other suitable place preferably at a point where it is out of sight.

A further modification of the invention is illustrated in Figures 6, 7 and 8 to which detailed reference will now be made.

This form of the invention is essentially the same as that disclosed in Figures 4 and 5 except that the elastic retracting cord is attached to the upper edge of the rear surface of the seat back 24. Accordingly, when the belt is retracted as shown in Figure 6 the retracting loop is formed along the rear surface of the seat back 24 rather than under the main seat cushion 20. The attaching hook 124, the cord 122, the roller 114 and the fastener 118 may be identical with corresponding elements of the retractor of Figures 4 and 5 and the retracting and advancing action is the same in the two forms of the invention.

To facilitate free movement of the belt around the lower rear edge of the seat back 24 an additional sheet metal or plastic fitting 128 may be utilized and secured in place by any suitable means such as screws 130. This form of the invention is particularly useful in sports cars, aircraft and boats, for example, where the appearance of the seat back is of secondary importance or in passenger vehicles where there is not sufficient room beneath the seat cushion to permit the formation of the loop in the manner disclosed in Figures 4 and 5.

Figures 6, 7 and 8 also disclose a modified form of the guide bracket which may be utilized in any of the forms of the invention in lieu of the guide brackets 39 and 106. The modified bracket comprises a strip 132 preferably of metal or plastic similar to the body member 108 of the assembly 106. The strip 132 is curved on a sufficiently short radius that it compresses the rear portion of the seat cushion 20 to form a path between the seat and the seat back 24 to permit free passage of the safety belt sections. Preferably, bolts 134 are provided which extend through the seat cushion 20 and are hidden by the seat back 24 to maintain a predetermined spacing between the free ends of the strip 132 and thus assure the necessary compression of the rear portion of the seat cushion 20.

A U-shaped bracket 136 of sheet metal, plastic or the like is secured to the upper surface of the member 132 beneath the rear edge of the seat back 24 preferably by suitable spot welds 138. The bracket 136 is fastened to the strip 132 directly over an upwardly projecting dimple 140 formed in the strip 132 so that a relatively narrow path is formed between the upper surface of the dimple and the lower surface of the center section of the bracket 136.

As best shown in Figure 8 a retainer 142 of webbing, plastic or other suitable material is secured to the underside of the belt sections 30 and 32 to effectively increase the thickness of the belt sufficiently so that the free end of the belt cannot pass through the space between the dimple 140 and the under surface of the bracket 136. It will be understood that this mechanism is not necessary for the belt sections 28 and 34 because of the thickness of the fittings 36.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

This application is a continuation-in-part of application Serial No. 599,755, filed July 24, 1956, now abandoned.

What is claimed and desired to be secured by United States Letters Patent is:

A safety belt assembly for a vehicle having a frame and a seat comprising a pair of belts adapted to be secured together at one end in surrounding relation with a passenger, means securing the opposite end of each of said belts to said frame adjacent the rear of said seat, a pair of guide assemblies mounted underneath said seat generally opposite the point of attachment of the respective belts to said frame, retractors mounted in said guide assemblies for movement toward and away from the adjacent portion of said belt, means on said retractors slidably engaging said belts between said frame and said seat, retaining assemblies mounted on said guide assemblies adjacent the front of said seat, and springs comprising metal straps, the opposite ends of which are coiled around said retaining assemblies and said retractors, respectively, to urge said retractors toward the front of said seat to form a loop in each of said belts and thereby move the free ends of said belts to a retracted position.

References Cited in the file of this patent

UNITED STATES PATENTS

| | | |
|---|---|---|
| 2,071,903 | Shively | Feb. 23, 1937 |
| 2,488,858 | Franz | Nov. 22, 1949 |
| 2,649,145 | McCarthy | Aug. 18, 1953 |
| 2,650,655 | Neahr et al. | Sept. 1, 1953 |
| 2,710,649 | Griswold | June 14, 1955 |
| 2,716,561 | Beran | Aug. 30, 1955 |
| 2,725,097 | Thoreson | Nov. 29, 1955 |
| 2,798,539 | Johnson | July 9, 1957 |
| 2,830,655 | Lalande | Apr. 15, 1958 |
| 2,861,627 | Smith | Nov. 25, 1958 |